(12) United States Patent
Karasawa

(10) Patent No.: US 6,661,813 B2
(45) Date of Patent: *Dec. 9, 2003

(54) MULTIPLEXING APPARATUS AND METHOD AND STORAGE MEDIUM

(75) Inventor: Katsumi Karasawa, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,349

(22) Filed: May 22, 2000

(65) Prior Publication Data

US 2003/0112834 A1 Jun. 19, 2003

(30) Foreign Application Priority Data

May 25, 1999 (JP) ............................. 11-145542

(51) Int. Cl.[7] .............................................. H04L 12/56
(52) U.S. Cl. ..................................... 370/537; 348/423.1
(58) Field of Search ................................ 370/538, 537, 370/474, 395, 389; 348/423.1

(56) References Cited

U.S. PATENT DOCUMENTS

| | | | |
|---|---|---|---|
| 5,555,192 A | * | 9/1996 | Grube et al. |
| 5,898,687 A | * | 4/1999 | Harriman et al. ............ 370/390 |
| 6,069,877 A | * | 5/2000 | Yang ........................... 370/352 |
| 6,163,539 A | * | 12/2000 | Alexander et al. .......... 370/392 |
| 6,233,255 B1 | * | 5/2001 | Kato et al. ................... 370/486 |
| 6,233,258 B1 | * | 5/2001 | Kanehara ..................... 370/537 |

* cited by examiner

Primary Examiner—Kenneth Vanderpuye
(74) Attorney, Agent, or Firm—Fitzpatrick, Cella, Harper & Scinto

(57) ABSTRACT

A multiplexing apparatus/method is characterized by inputting a plurality of data streams with which identification information of data is multiplexed, extracting the identification information multiplexed with the plurality of input data streams from the plurality of input data streams, detecting pieces of identification information, of the extracted identification information extracted, which are redundant among the respective data streams, replacing the detected identification information with new identification information, and multiplexing the plurality of data streams obtained by replacement.

7 Claims, 8 Drawing Sheets

US 6,661,813 B2

1

MULTIPLEXING APPARATUS AND METHOD AND STORAGE MEDIUM

BACKGROUND OF THE INVENTION

1. Field of the Invention

The present invention relates to multiplex processing suitably used to multiplex a plurality of transport streams in a data transmission system of transport streams which is a data transmission format.

2. Related Background Art

A digital processing system complying with MPEG (Moving Picture Experts Group) 2 specifications (ISO/IEC (International Organization for Standardization/International Electrotechnical Commission 13818-1 to 13818-3) has recently become a standard as a video transmission system.

FIG. 1 is a block diagram showing the arrangement of a digital transmission apparatus on the transmission side of a general digital video transmission system complying with ISO/IEC 13818-1 to 13818-3.

Referring to FIG. 1, this system includes a video data input terminal 301, an audio data input terminal 302, a PCR (Program Clock Reference) generator 303 specified by ISO/IEC 13818-1, a video encoder 304 for compressing/coding digital video data in compliance with ISO/IEC 13818-2, an audio encoder 305 for compressing/coding digital audio data in compliance with ISO/IEC 13818-3, a TS generator 306 for generating a transport stream (TS) in compliance with ISO/IEC 13818-1, and an output terminal 307 for outputting a generated transport stream.

The transmitting operation of the digital transmission apparatus having the above arrangement will be described next.

The video encoder 304 compresses digital video data input to the video data input terminal 301 into low-redundancy data in compliance with ISO/IEC 13818-2 upon checking information with a spatially and temporally high correlation. In addition, the audio encoder 305 compresses the information amount of digital audio data input to the audio data input terminal 302, in compliance with ISO/IEC 13818-3.

Assume that a unit of these compressed data streams which can be expanded singly is an access unit (AU), and these data will be referred to as a video elementary stream and an audio elementary stream, respectively. Each of video and audio elementary streams is generally a unit based on an access unit and converted into a packetized elementary stream with a stream ID representing the attribute of the elementary stream, time stamp information representing a decoding time and display time on the decoding side, and the like.

The PCR generator 303 generates and outputs the PCR specified by ISO/IEC 13818-1. The TS generator 306 converts packetized video and audio data into fixed-length transport streams in accordance with a transmission path, and simultaneously multiplexes and outputs the streams with data output from the PCR generator 303. The TS generator 306 also generates PSI (Program Specific Information) specified by ISO/IEC 13818-1, assembles it into sections, and periodically multiplexes the resultant sections with the above transport streams. The transport streams generated in the above manner are output to the output terminal 307.

FIG. 2 shows a conventional multiplexing apparatus for a plurality of transport streams generated by using a plurality

2 of digital transmission apparatuses each having the same arrangement as that described above. Referring to FIG. 2, this apparatus includes transport stream input terminals 401 for receiving outputs from the respective digital transmission apparatuses, buffers 402 for storing the respective input transport streams, a TS multiplexer 403 for multiplexing a plurality of transport streams into one transport stream in accordance with a transmission path, and an output terminal 404 for outputting the multiplexed transport stream.

The operation of the multiplexing apparatus having the above arrangement will be described next.

The two transport streams generated by the digital transmission apparatus in FIG. 1 are respectively stored in the buffers 402 through the input terminals 401 in FIG. 2. The TS multiplexer 403 time-divisionally multiplexes the transport streams stored in the respective buffers 402 into one transport stream in accordance with a transmission path, and outputs the transport stream to the output terminal 404. In addition, the PSI multiplexed with each transport stream is decoded to generate new PSI, and this new PSI is multiplexed with the multiplexed transport stream.

Reproduction of the above program specification information will be described with reference to FIGS. 3 and 4.

FIG. 3 shows the PSI multiplexed with each of the two transport streams.

Referring to FIG. 3, "program_association_table" indicates a program list multiplexed with the transport stream and is assigned a program number ("program_number") and a packet identifier ("program_map_PID") for each program.

Referring to FIG. 3, program number 0x0001 and packet identifier 0x0011 are assigned to transport stream 1, and program number 0x0002 and packet identifier 0x0021 are assigned to transport stream 2.

Subsequently, "program_map_table" receives "program_association_table", and a packet identifier is assigned to each element in one program. Referring to FIG. 3, in transport stream 1, 0x0012, 0x0013, and 0x0014 are respectively assigned to "PCR_PID", "video_elementary_PID", and "audio_elementary_PID". In transport stream 2, 0x0022, 0x0023, and 0x0024 are respectively assigned to "PCR_PID", "video_elementary_PID", and "audio_elementary_PID".

The two pieces of program specification information in FIG. 3 are multiplexed into one new piece of program specification information like the one shown in FIG. 4.

The two pieces of "program association_table" in FIG. 3 are compiled into one piece of "program_association_table" in FIG. 4, and two programs are defined in this "program_association_table". The two pieces of "program_map_table" in FIG. 3 are assigned as two pieces of "program_map_table" without any change, as shown in FIG. 4.

According to the data multiplexing method using the above conventional multiplexing apparatus, in multiplexing operation, pieces of program specification information can be properly reconstructed only when different PIDs (Packet Identifiers) are assigned to the respective pieces of program specification information multiplexed with input original transport streams.

If identical identifiers are assigned to the respective pieces of program specification information of a plurality of input transport streams, new program specification information for the multiplexed transport stream cannot be properly reconstructed. In addition, the PIDs as the identifiers of the respective elementary streams become redundant and cannot be properly decoded by a decoder.

Another method is available, in which program specification information after multiplexing is fixed, the original identifiers are ignored, and new PIDs are assigned to the respective programs and elementary streams. In this case, however, it is difficult to manage an increase/decrease in the number of programs to be input and the number of inputs, and all PIDs must be updated every time an input is changed. Furthermore, it is very difficult to associate originally assigned program specification information with newly generated program specification information.

SUMMARY OF THE INVENTION

The present invention has been in consideration of the above situation, and has as its object to provide a multiplexing apparatus and method which can multiplex a plurality of transport streams by adaptively generating program specification information of a multiplexed transport stream without managing the program specification information of each input transport stream in advance, and a storage medium storing a processing program for the multiplexing process.

In order to achieve the above object, according to an aspect of the present invention, there is provided a multiplexing apparatus/method characterized by inputting a plurality of data streams with which identification information of data is multiplexed, extracting the identification information multiplexed with the plurality of input data streams from the plurality of input data streams, detecting pieces of identification information, of the extracted identification information extracted, which are redundant among the respective data streams, replacing the detected identification information with new identification information, and multiplexing the plurality of data streams obtained by replacement.

In addition, according to another aspect of the present invention, there is provided a storage medium storing a program for executing the input step of inputting a plurality of data streams with which identification information of data is multiplexed, the extraction step of extracting the identification information multiplexed with the plurality of input data streams from the plurality of input data streams, the detection step of detecting pieces of identification information, of the extracted identification information extracted, which are redundant among the respective data streams, the replacing step of replacing the detected identification information with new identification information, and the multiplexing step of multiplexing the plurality of data streams obtained by replacement.

Other objects, features and advantages of the invention will become apparent from the following detailed description taken in conjunction with the accompanying drawings.

DETAILED DESCRIPTION OF THE PREFERRED EMBODIMENT

An embodiment of the present invention will be described below with reference to the accompanying drawings.

The embodiment is illustrated with a case that video data coded according to ITU-T (International Telecommunication Union-Telecommunication Standardization Sector) recommendation H. 222.0: ISO/IEC 13818-2 is system-coded according to ITU-T recommendation H. 222.0: ISO/IEC 13818-1.

Figure 1:
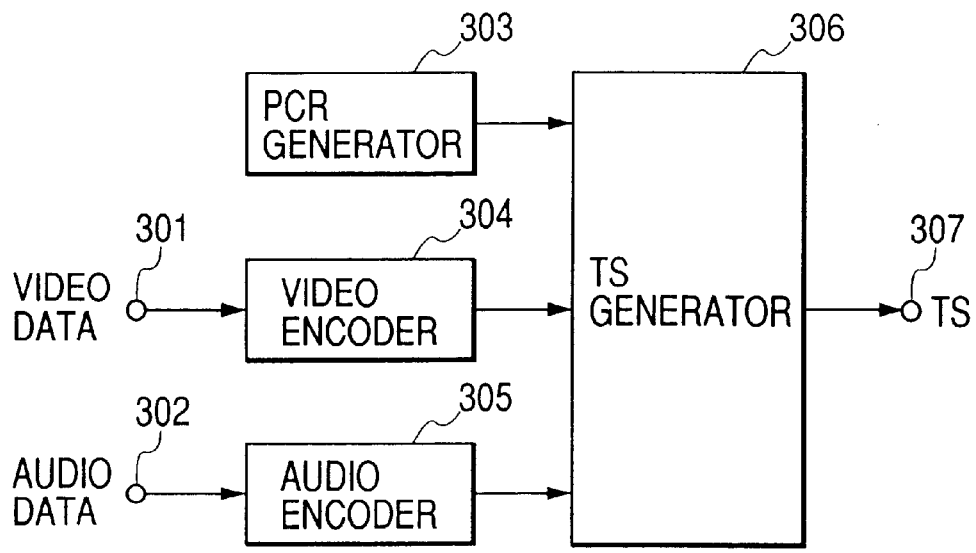
FIG. 1 is a block diagram showing the arrangement of a conventional digital transmission apparatus.
Figure 2:
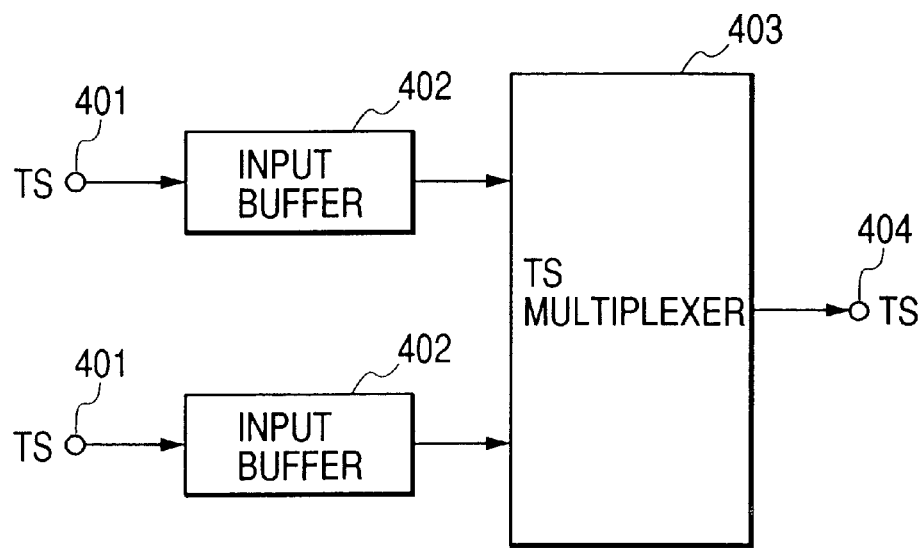
FIG. 2 is a block diagram showing the arrangement of a conventional multiplexing apparatus.
Figure 3:
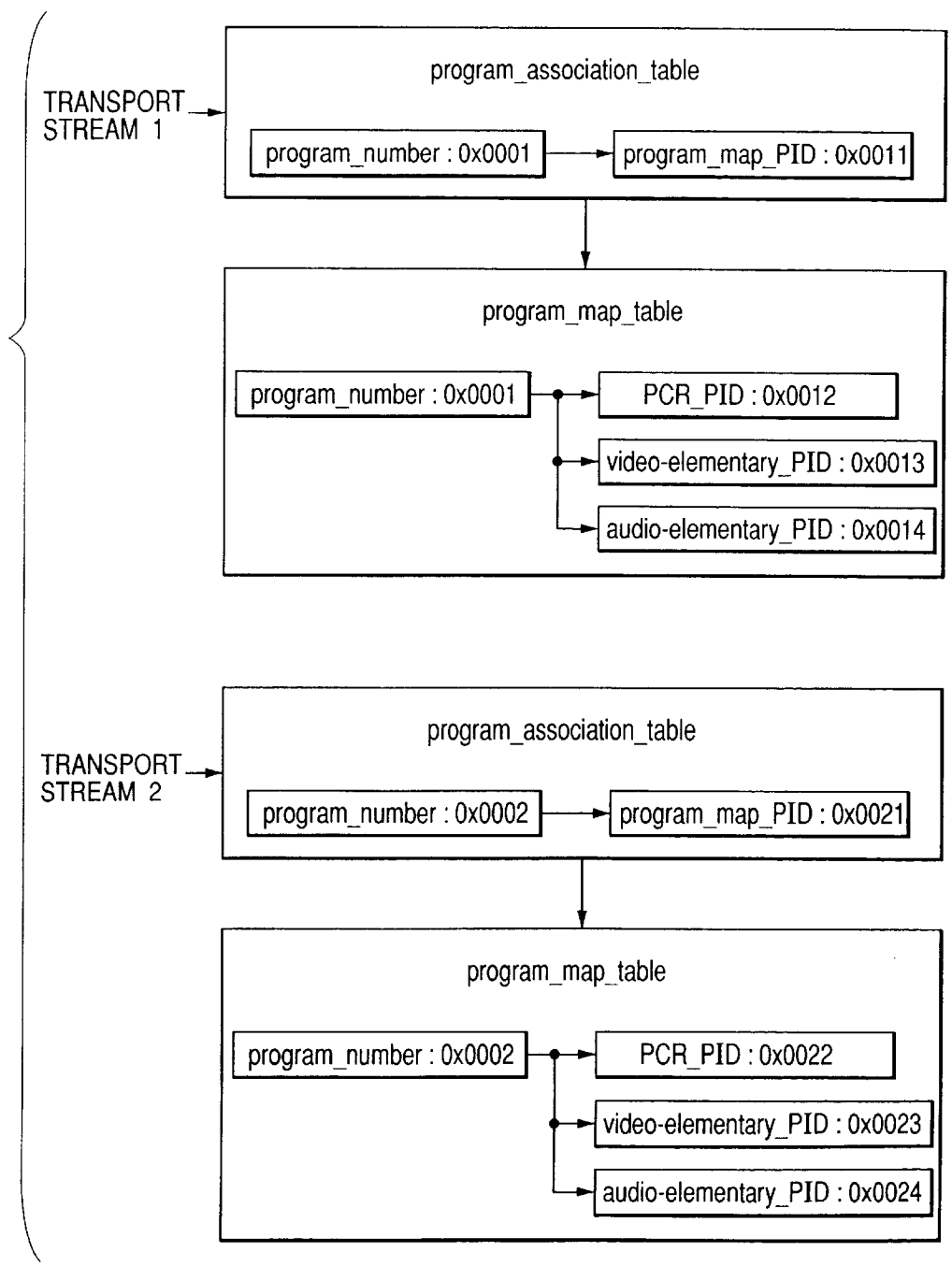
FIG. 3 is a view showing program specification information before multiplexing.
Figure 4:
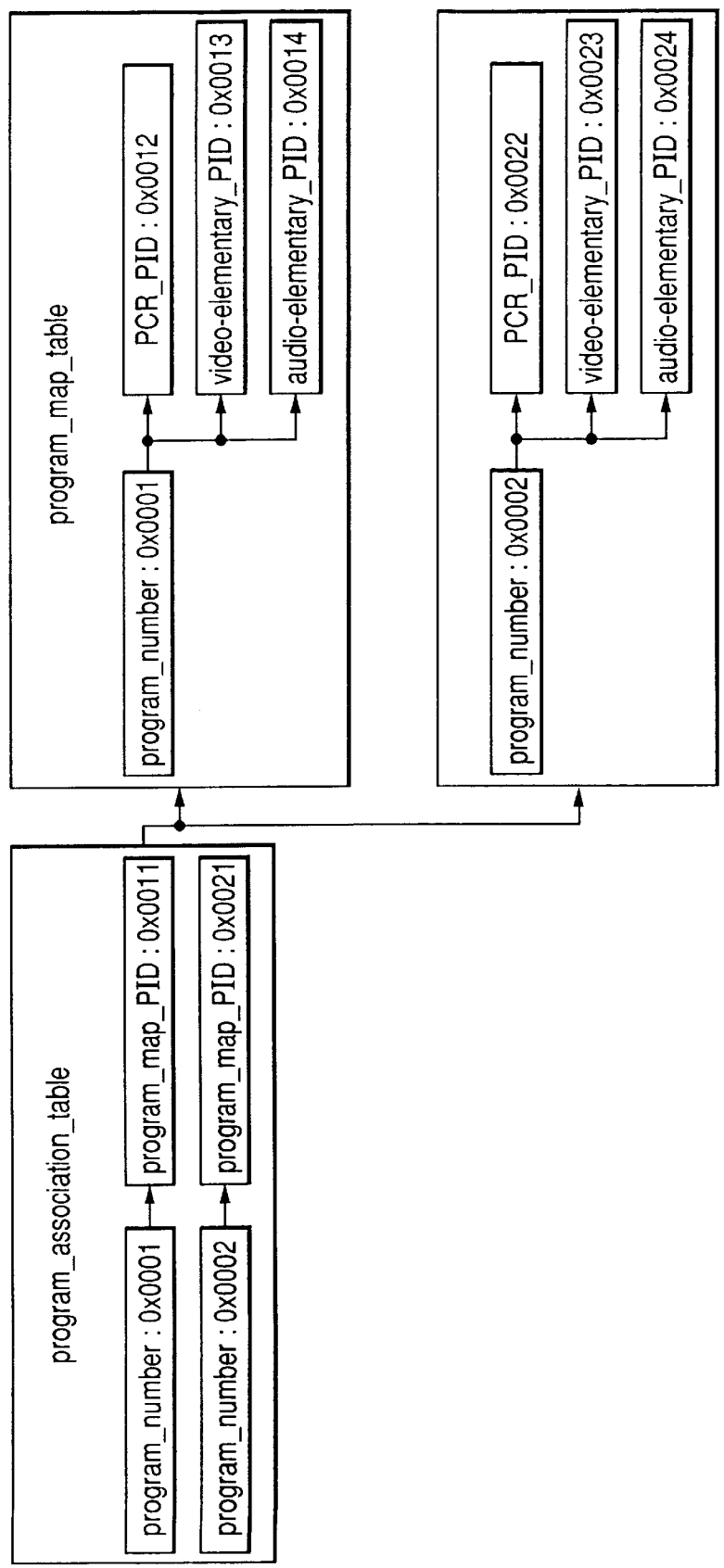
FIG. 4 is a view showing program specification information after multiplexing.
Figure 5:
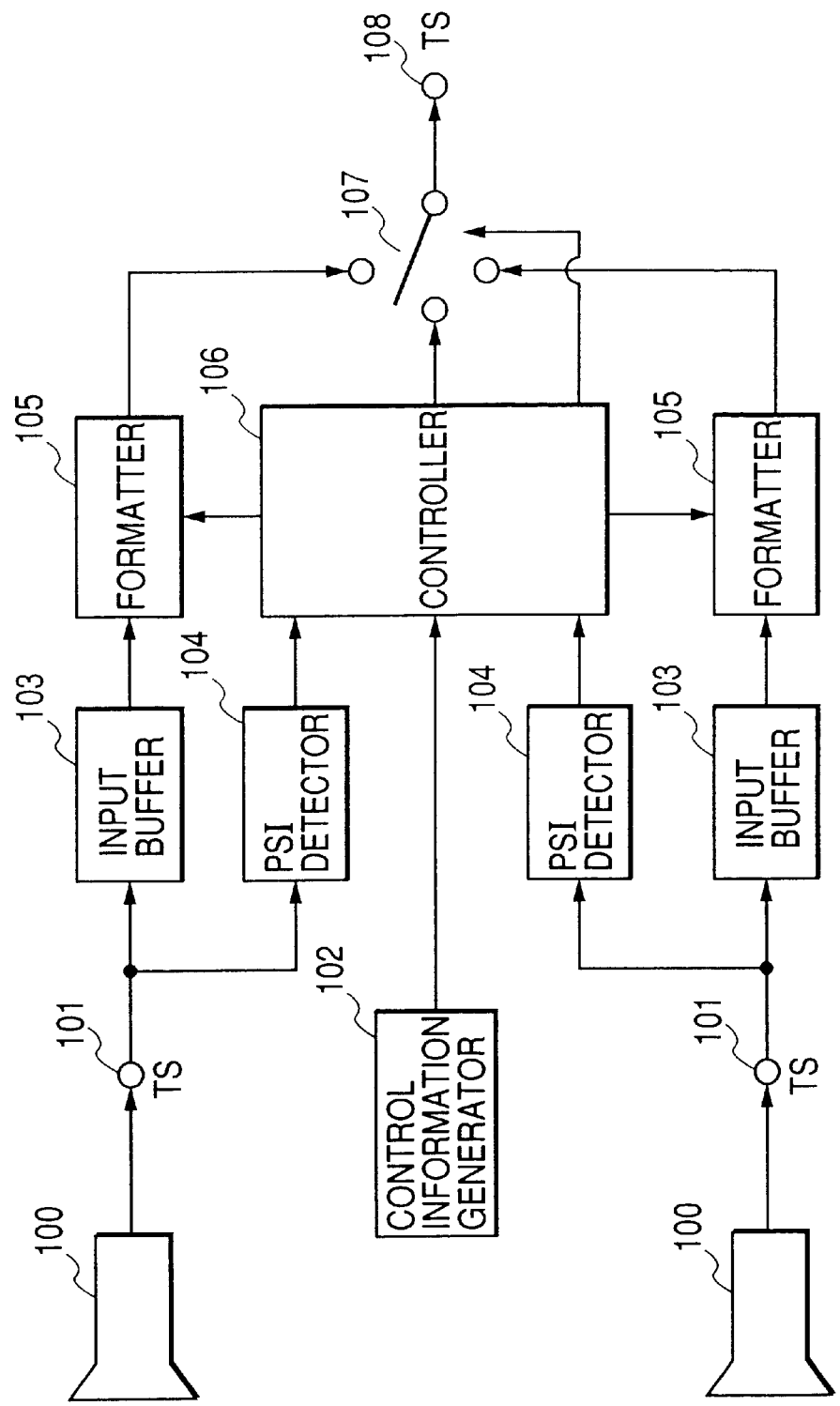
FIG. 5 is a block diagram showing the arrangement of a multiplexing apparatus according to the first embodiment of the present invention.
Figure 6:
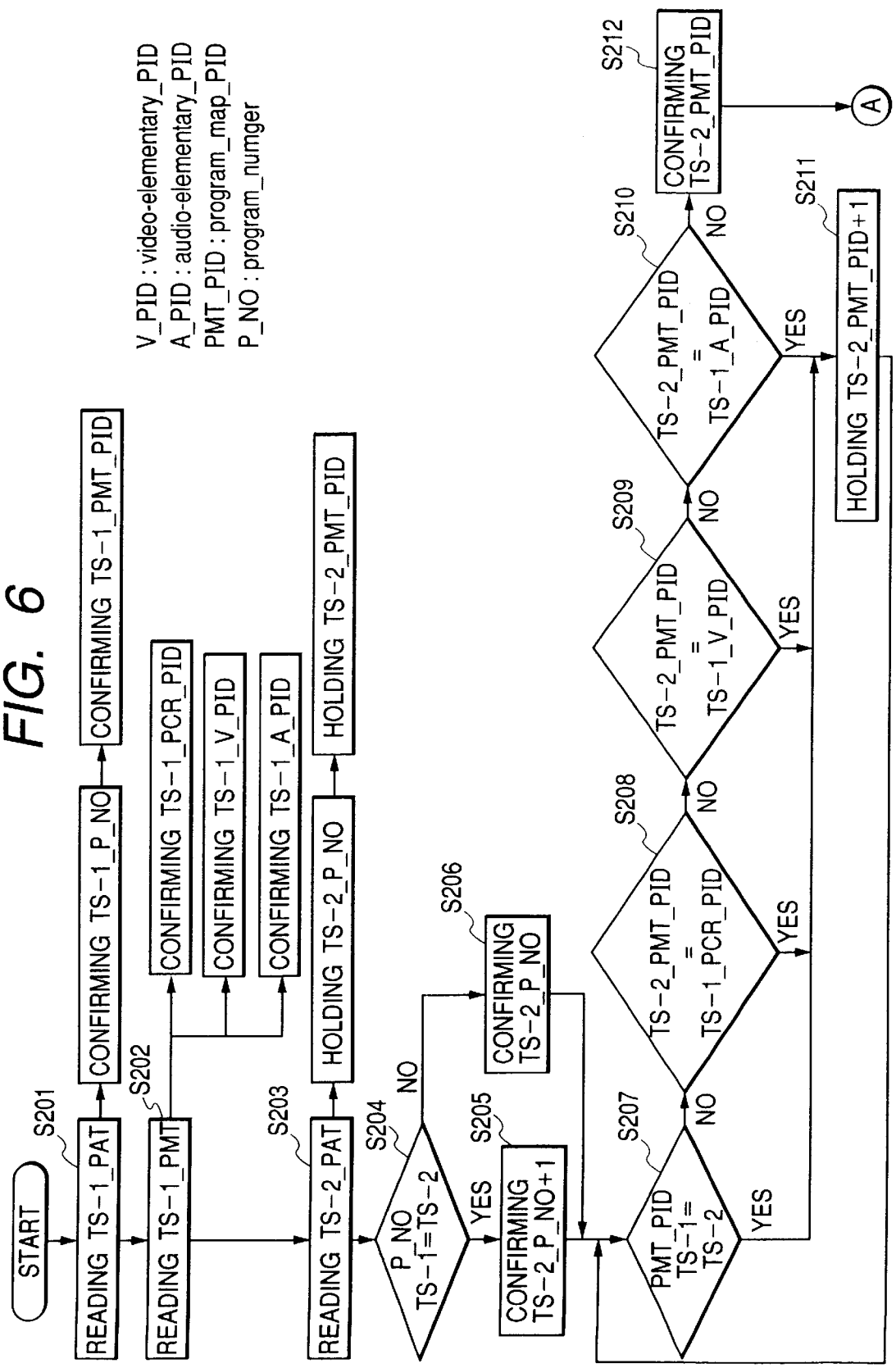
FIG. 6 is a flow chart showing the operation of a controller in FIG. 5.
Figure 7:
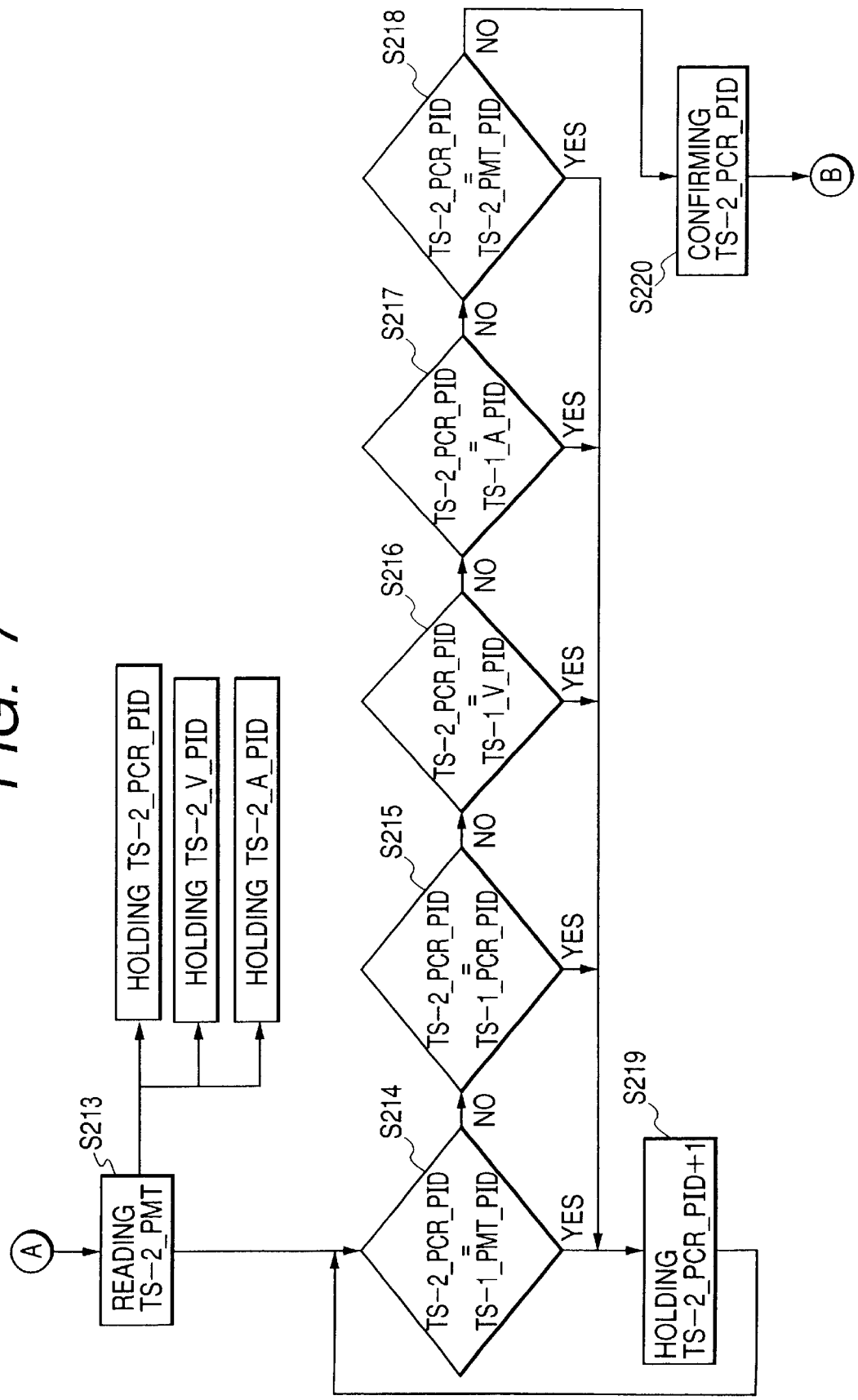
FIG. 7 is a flow chart showing the operation of the controller in FIG. 5.
Figure 8:
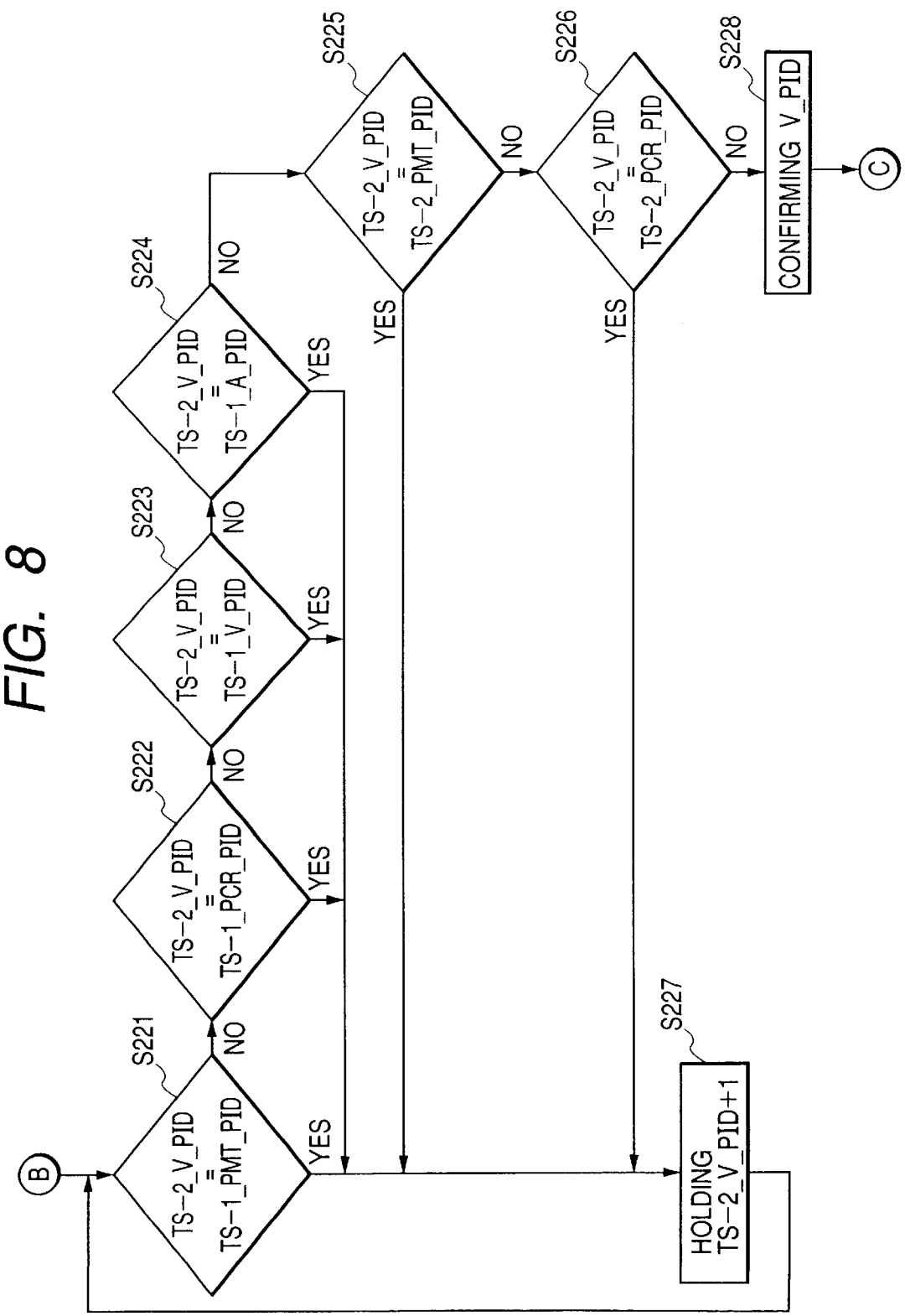
FIG. 8 is a flow chart showing the operation of the controller in FIG. 5.
Figure 9:
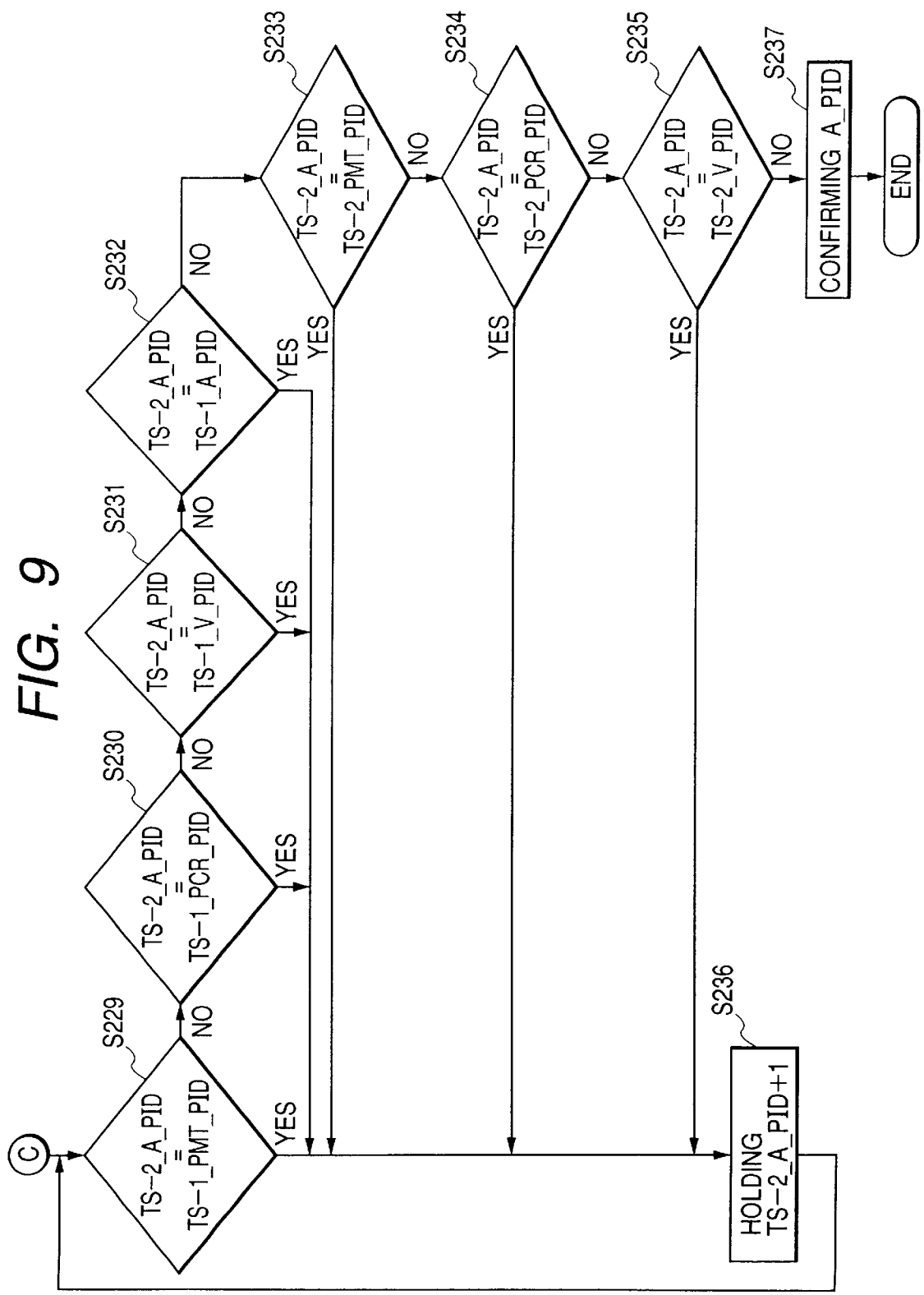
FIG. 9 is a flow chart showing the operation of the controller in FIG. 5.

FIG. 5 is a block diagram showing the arrangement of a multiplexing apparatus according to the first embodiment of the present invention.

Referring to FIG. 5, this apparatus includes video cameras 100 which have recording/reproducing units and can transmit transport stream packets coded in compliance with ITU-T recommendation H. 222.0: ISO/IEC 13818-1 to 13818-3, input terminals 101 to which a plurality of (two in FIG. 5) transport stream packets coded in compliance with ITU-T recommendation H. 222.0: ISO/IEC 13818-1 to 13818-3 are input, and a control information generator 102 for controlling multiplexing operation.

This apparatus also includes input buffers 103 for storing the input transport stream packets, PSI detectors 104 for extracting program specification information multiplexed with the input transport streams, formatters 105 for reassembling the input transport streams, a controller 106 for controlling conversion from a plurality of transport stream packets into one transport stream packet, a stream switching unit 107 for switching streams in accordance with a transmission path, and a transport stream packet output terminal 108 from which a multiplexed transport stream packet is output.

The operation of the multiplexing apparatus having the above arrangement will be described next.

Transport packets are supplied from the video cameras 100 to the input terminals 101. The plurality of transport stream packets input through the input terminals 101 are stored in the input buffers 103 and also input to the PSI detectors 104. The PSI detectors 104 extract program specification information multiplexed with the transport streams and supply the extracted program specification information to the controller 106.

The controller 106 compares all the pieces of program specification information supplied from the PSI detectors 104 and generates new program specification information complying with ITU-T recommendation H. 222.0: ISO/IEC 13818-1. The controller 106 also supplies pieces of PID information as program identifiers assigned on the basis of the newly generated program specification information to the formatters 105, and transfers data from the input buffers 103 to the formatters 105 in accordance with a transmission path.

The formatters 105 multiplex the PID information supplied from the controller 106 with the packets transferred from the input buffers 103. The stream switching unit 107 adaptively switches the program specification information generated by the formatters 105 and controller 106 in accordance with control information from the controller 106 so as to output a multiplexed transport stream to the transport stream packet output terminal 108.

In addition, arbitrary packet identifiers can be generated by supplying control information from the control information generator 102 to the controller 106.

Program specification information reconstruction operation performed by the controller 106 when two input transport streams are multiplexed into one transport stream will be described in detail next with reference to the flow charts of FIGS. 6 to 9.

In step S201, the controller 106 reads a PAT which is program specification information multiplexed with the first transport stream. In the read PAT ("program_association_table"), "program_number" and "program_map_PID" are held without any change.

In step S202, the controller 106 reads a PMT ("program_map_table") on the basis of read "program_map_PID" read in step S202. In the read PMT, "PCR_PID", "video_elementary_PID", and "audio_elementary_PID" are held without any change. In step S203, the controller 106 reads a PAT which is program specification information multiplexed with the second transport stream. In the read PAT, "program_number" and "program_map_PID" are temporarily held in the buffer.

In step S204, the controller 106 compares "program_number" extracted from the first transport stream read in advance with "program_number" extracted from the second transport stream held in the buffer. If they coincide with each other, the flow advances to step S205. If they do not coincide with each other, the flow advances to step S206.

In step S205, the controller 106 adds 1 to "program_number" extracted from the second transport stream and registers the resultant data as new "program_number". In step S206, the controller 106 registers "program_number" extracted from the second transport stream as "program_number" without any change.

In step S207, the controller 106 compares "program_map_PID" extracted from the first transport stream read in advance with "program_map_PID" extracted from the second transport stream held in the buffer. If they coincide with each other, the flow advances to step S211. If they do not coincide with each other, the flow advances to step S208.

In step S208, the controller 106 compares "PCR_PID" extracted from the first transport stream read in advance with "program_map_PID" extracted from the second transport stream held in the buffer. If they coincide with each other, the flow advances to step S211. If they do not coincide with each other, the flow advances to step S209.

In step S209, the controller 106 compares "video_elementary_PID" extracted from the first transport stream read in advance with "program_map_PID" extracted from the second transport stream held in the buffer. If they coincide with each other, the flow advances to step S211. If they do not coincide with each other, the flow advances to step S210.

In step S210, the controller 106 compares "audio_elementary_PID" extracted from the first transport stream read in advance with "program_map_PID" extracted from the second transport stream held in the buffer. If they coincide with each other, the flow advances to step S211. If they do not coincide with each other, the flow advances to step S212. In step S211, the controller 106 adds 1 to "program_map_PID" extracted from the second transport stream, and the flow returns to step S207. In step S212, the controller 106 registers "program_number" held in the buffer.

In step S213, the controller 106 reads a PMT on the basis of "program_map_PID" read in step S203. Then, "PCR_PID", "video_elementary_PID", and "audio_elementary_PID" in the read PMT are held in the buffer. In step S214, the controller 106 compares "program_map_PID" extracted from the first transport stream read in advance with "PCR_PID" extracted from the second transport stream held in the buffer. If they coincide with each other, the flow advances to step S219. If they do not coincide with each other, the flow advances to step S215.

In step S215, the controller 106 compares "PCR_PID" extracted from the first transport stream read in advance with "PCR_PID" extracted from the second transport stream held in the buffer. If they coincide with each other, the flow advances to step S219. If they do not coincide with each other, the flow advances to step S216.

In step S216, the controller 106 compares "video_elementary_PID" extracted from the first transport stream read in advance with "PCR_PID" extracted from the second transport stream held in the buffer. If they coincide with each other, the flow advances to step S219. If they do not coincide with each other, the flow advances to step S217.

In step S217, the controller 106 compares "audio_elementary_PID" extracted from the first transport stream read in advance with "PCR_PID" extracted from the second transport stream held in the buffer. If they coincide with each other, the flow advances to step S219. If they do not coincide with each other, the flow advances to step S218.

In step S218, the controller 106 compares "program_map_PID" extracted from the second transport stream read in advance with "PCR_PID" extracted from the second transport stream held in the buffer. If they coincide with each other, the flow advances to step S219. If they do not coincide with each other, the flow advances to step S220.

In step S219, the controller 106 adds 1 to "PCR_PID" extracted from the second transport stream, and the flow returns to step S214. In step S220, the controller 106 registers "PCR_PID" held in the buffer.

In step S221, the controller 106 compares "program_map_PID" extracted from the first transport stream read in advance with "video_elementary_PID" extracted from the second transport stream held in the buffer. If they coincide with each other, the flow advances to step S227. If they do not coincide with each other, the flow advances to step S222.

In step S222, the controller 106 compares "PCR_PID" extracted from the first transport stream read in advance with "video_elementary_PID" extracted from the second transport stream held in the buffer. If they coincide with each other, the flow advances to step S227. If they do not coincide with each other, the flow advances to step S223.

In step S223, the controller 106 compares "video_elementary_PID" extracted from the first transport stream read in advance with "video_elementary_PID" extracted from the second transport stream held in the buffer. If they coincide with each other, the flow advances to step S227. If they do not coincide with each other, the flow advances to step S224.

In step S224, the controller 106 compares "audio_elementary_PID" extracted from the first transport stream read in advance with "video_elementary_PID" extracted from the second transport stream held in the buffer. If they coincide with each other, the flow advances to step S227. If they do not coincide with each other, the flow advances to step S225.

In step S225, the controller 106 compares "program_map_PID" extracted from the second transport stream read in advance with "video_elementary_PID" extracted from the second transport stream held in the buffer. If they coincide with each other, the flow advances to step S227. If they do not coincide with each other, the flow advances to step S226.

In step S226, the controller 106 compares "PCR_PID" extracted from the second transport stream read in advance with "video_elementary_PID" extracted from the second transport stream held in the buffer. If they coincide with each other, the flow advances to step S227. If they do not coincide with each other, the flow advances to step S228.

In step S227, the controller 106 adds 1 to "video_elementary_PID" extracted from the second transport stream, and flow returns to step S221 again.

In step S228, the controller 106 registers "video_elementary_PID" held in the buffer.

In step S229, the controller 106 compares "program_map_PID" extracted from the first transport stream read in advance with "audio_elementary_PID" extracted from the second transport stream held in the buffer. If they coincide with each other, the flow advances to step S236. If they do not coincide with each other, the flow advances to step S230.

In step S230, the controller 106 compares "PCR_PID" extracted from the first transport stream read in advance with "audio_elementary_PID" extracted from the second transport stream held in the buffer. If they coincide with each other, the flow advances to step S236. If they do not coincide with each other, the flow advances to step S231.

In step S231, the controller 106 compares "video_elementary_PID" extracted from the first transport stream read in advance with "audio_elementary_PID" extracted from the second transport stream held in the buffer. If they coincide with each other, the flow advances to step S236. If they do not coincide with each other, the flow advances to step S232.

In step S232, the controller 106 compares "audio_elementary_PID" extracted from the first transport stream read in advance with "audio_elementary_PID" extracted from the second transport stream held in the buffer. If they coincide with each other, the flow advances to step S236. If they do not coincide with each other, the flow advances to step S233.

In step S233, the controller 106 compares "program_map_PID" extracted from the second transport stream read in advance with "audio_elementary_PID" extracted from the second transport stream held in the buffer. If they coincide with each other, the flow advances to step S236. If they do not coincide with each other, the flow advances to step S234.

In step S234, the controller 106 compares "PCR_PID" extracted from the second transport stream read in advance with "audio_elementary_PID" extracted from the second transport stream held in the buffer. If they coincide with each other, the flow advances to step S236. If they do not coincide with each other, the flow advances to step S235.

In step S235, the controller 106 compares "video_elementary_PID" extracted from the second transport stream read in advance with "audio_elementary_PID" extracted from the second transport stream held in the buffer. If they coincide with each other, the flow advances to step S236. If they do not coincide with each other, the flow advances to step S237.

In step S236, the controller 106 adds 1 to "audio_elementary_PID" extracted from the second transport stream, and the flow returns to step S229.

In step S237, the controller 106 registers "audio_elementary_PID" held in the buffer.

After all the above steps are completed, the registered packet identification information becomes new program specification information.

According to the above description, two transport streams are processed, and one program is multiplexed with each transport stream. If, however, three transport streams are to be processed and one program is multiplexed with each transport stream, the flow returns to step S204 again after the execution of steps S201 to S237, and steps S204 to S237 are executed again.

In this case, program specification information multiplexed with the third transport stream needs to be checked. In this check, one condition is added to each decision step. For example, in step S204, the controller 106 compares "program_number" in the first transport stream with "program_number" in the third transport stream, and also compares "program_number" in the second transport stream with "program_number" in the third transport stream.

Likewise, in each subsequent decision step, the controller 106 compares each packet identification information in the first transport stream with that in the third transport stream, and also compares each packet identification information in the second transport stream with that in the third transport stream.

When three or more transport streams are multiplexed, the number of determination conditions increases in the same manner. Furthermore, if a plurality of programs are multiplexed with each transport stream to be multiplexed, similar operation is performed. When, for example, pieces of program specification information are to be read in steps S201 and S202 and the like, all the pieces of program specification information are read by an amount equal to the number of programs multiplexed, and are added as conditions in the subsequent decision steps.

Note that the present invention may be applied to either a system constituted by a plurality of devices (e.g., a host computer, an interface device, a reader, and a printer), or an apparatus consisting of a single device (e.g., a video recorder).

The objects of the present invention are also achieved by supplying a program code of software that can realize the functions of the above embodiment to the CPU or MPU in the computer in the apparatus or system connected to the respective devices, and making the computer operate the respective devices in accordance with the program.

In this case, the program code of the software itself realizes the functions of the above embodiment, and a means for supplying the program code to the computer, e.g., a storage medium which stores the program code, also constitutes the present invention. As the storage medium storing the program code, for example, a floppy disk, hard disk, optical disk, magneto-optical disk, CD-ROM, CD-RAM, magnetic recording medium, nonvolatile memory card, semiconductor storage devices such as ROM and RAM, and the like may be used.

This program code realizes the functions of the embodiment of the present invention not only in a case wherein the functions of the above embodiment are realized by executing the supplied program code by the computer but also in a case wherein the functions of the above embodiment are realized in cooperation with an OS (operating system) running on the computer or other applications.

Furthermore, the functions of the above embodiment may be realized by some or all of actual processing operations executed by a CPU or the like arranged in a function expansion board or a function expansion unit, which is inserted in or connected to the computer, on the basis of instructions from the program code, after the supplied program code is stored in a memory in the function expansion board of the computer or the function expansion unit connected to the computer.

As has been described above, according to the embodiment, the redundancy of packet identification information in program specification information in a plurality of transport streams to be multiplexed is monitored, and new packet identifiers are assigned if redundancy occurs, thereby easily multiplexing even a plurality of transport streams containing identical pieces of identification information without managing the program specification information in each input transport stream in advance.

In addition, the present invention can properly cope with an increase in the number of programs to be multiplexed and an increase in the number of transport streams to be input.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A multiplexing apparatus, comprising:
   a) input means for inputting a plurality of data streams, each of which is multiplexed with program specific information;
   b) extraction means for extracting the program specific information multiplexed with each of the plurality of input data streams from the plurality of input data streams;
   c) control means for detecting an overlapping program identifier between the program specific information extracted from the plurality of input data streams, and replacing the detected overlapping program identifier of a predetermined one of the program specific informations of the plurality of input data streams with a new program identifier while retaining the other program identifiers of the program specific informations of the plurality of input data streams; and
   d) data multiplexing means for multiplexing the plurality of data streams processed by said control means.

2. An apparatus according to claim 1, wherein the data streams include transport streams specified by ITU-T recommendation H. 222.0: ISO/IEC 13818-1 (1995), 13818-2 (1995) and 13818-3 (1995).

3. An apparatus according to claim 2, wherein the program specific information is information specified by ITU-T recommendation H. 222.0:ISO/IEC 13818-1 (1995).

4. An apparatus according to claim 3, wherein said control means detects duplication of all pieces of program identifiers in all pieces of the program specific information.

5. An apparatus according to claim 2, wherein said input means includes a video camera capable of outputting the transport streams.

6. A multiplexing methods, comprising the steps of:
   inputting a plurality of data streams, each of which is multiplexed with program specific information;
   extracting the program specific information multiplexed with each of the plurality of input data streams from the plurality of input data streams;
   detecting an overlapping program identifier between the program specific informations extracted from the plurality of input data streams;
   replacing the detected overlapping program identifier of a predetermined one of the program specific informations of the plurality of input data streams with a new program identifier while retaining the other program identifiers of the program specific informations of the plurality of input data streams; and
   multiplexing the plurality of data streams obtained in the replacing step.

7. A storage medium storing a program for executing a data multiplexing process, the process comprising the steps of:
   a) inputting a plurality of data streams, each of which is multiplexed with program specific information;
   b) extracting the program specific information multiplexed with each of the plurality of input data streams from the plurality of input data streams;
   c) detecting an overlapping program identifier between the program specific informations extracted from the plurality of input data streams;
   d) replacing the detected overlapping program identifier of a predetermined one of the program specific informations of the plurality of input data streams with a new program identifier while retaining the other program identifiers of the program specific informations of the plurality of input data streams; and
   e) multiplexing the plurality of data streams obtained in the replacing step.

* * * * *

UNITED STATES PATENT AND TRADEMARK OFFICE
CERTIFICATE OF CORRECTION

PATENT NO. : 6,661,813 B2
DATED : December 9, 2003
INVENTOR(S) : Karasawa

It is certified that error appears in the above-identified patent and that said Letters Patent is hereby corrected as shown below:

Column 3,
Line 15, "been" should read -- been designed --.

Column 8,
Lines 29 and 31, "packet" should read -- packet of --.

Column 10,
Line 15, "methods," should read -- method, --.

Signed and Sealed this

Fourth Day of January, 2005

JON W. DUDAS
*Director of the United States Patent and Trademark Office*